(No Model.) 10 Sheets—Sheet 2.

G. E. WRIGHT & W. MONK.
APPARATUS FOR EXTRACTING OIL.

No. 592,535. Patented Oct. 26, 1897.

Witnesses
H. van Oldenneel
E. A. Scott

Figure 4:
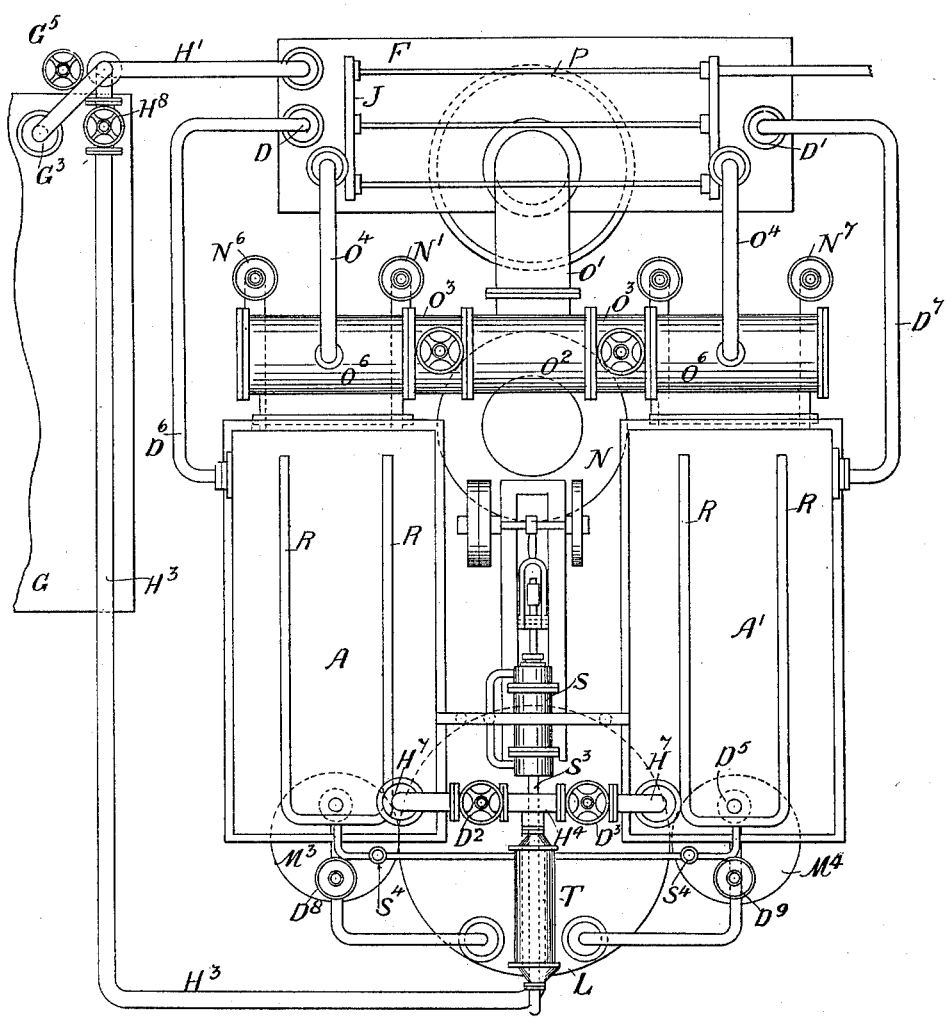

Inventors
George Edward Wright
William Monk
by Richards
Attorneys (No Model.) 10 Sheets—Sheet 5.
G. E. WRIGHT & W. MONK.
APPARATUS FOR EXTRACTING OIL.
No. 592,535. Patented Oct. 26, 1897.
FIG. 4.$^a$
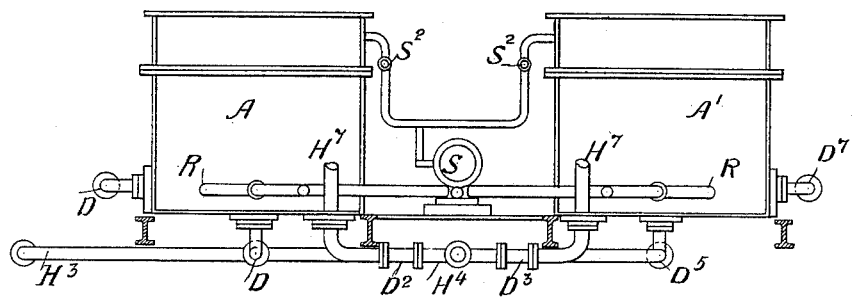
FIG. 5.
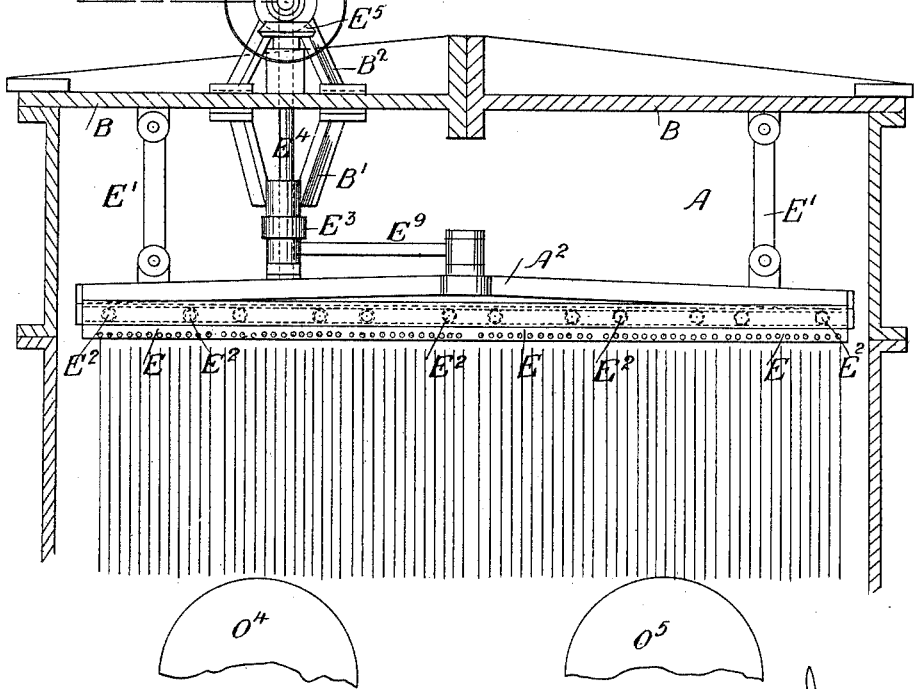

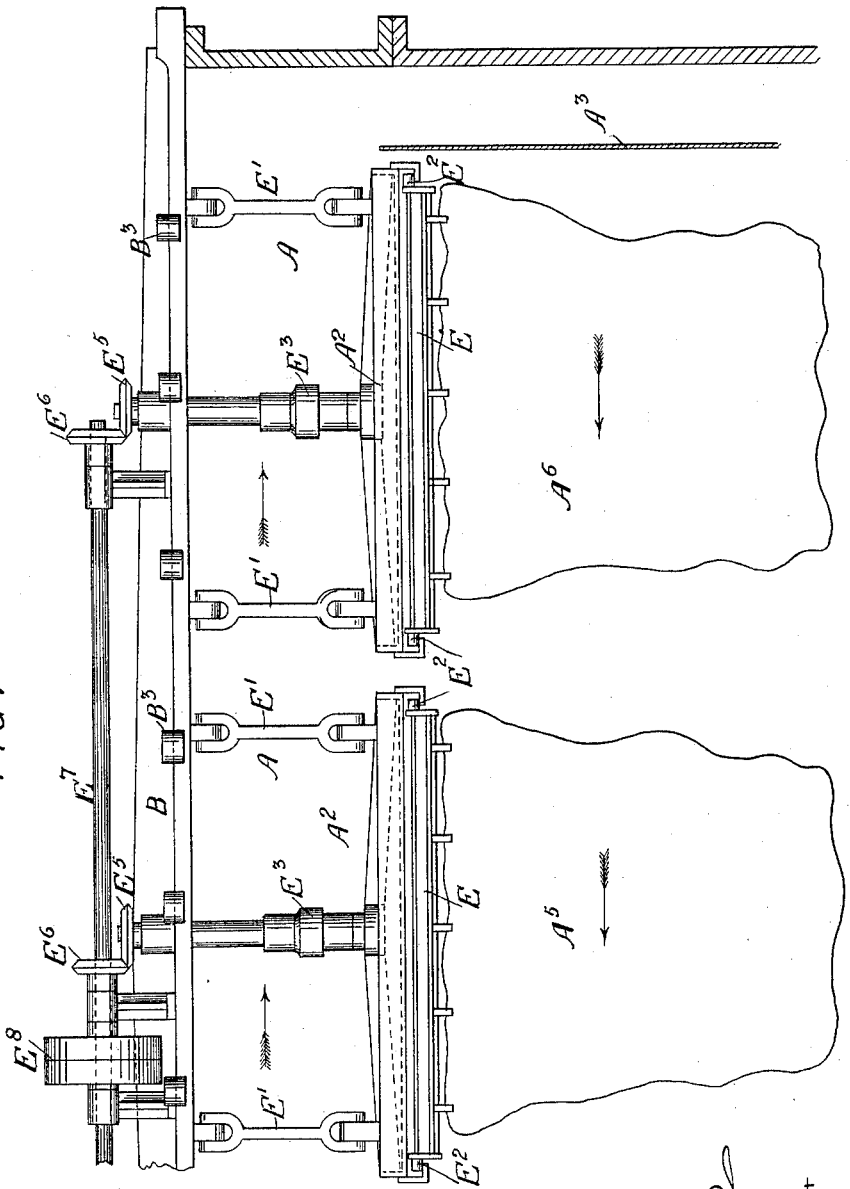

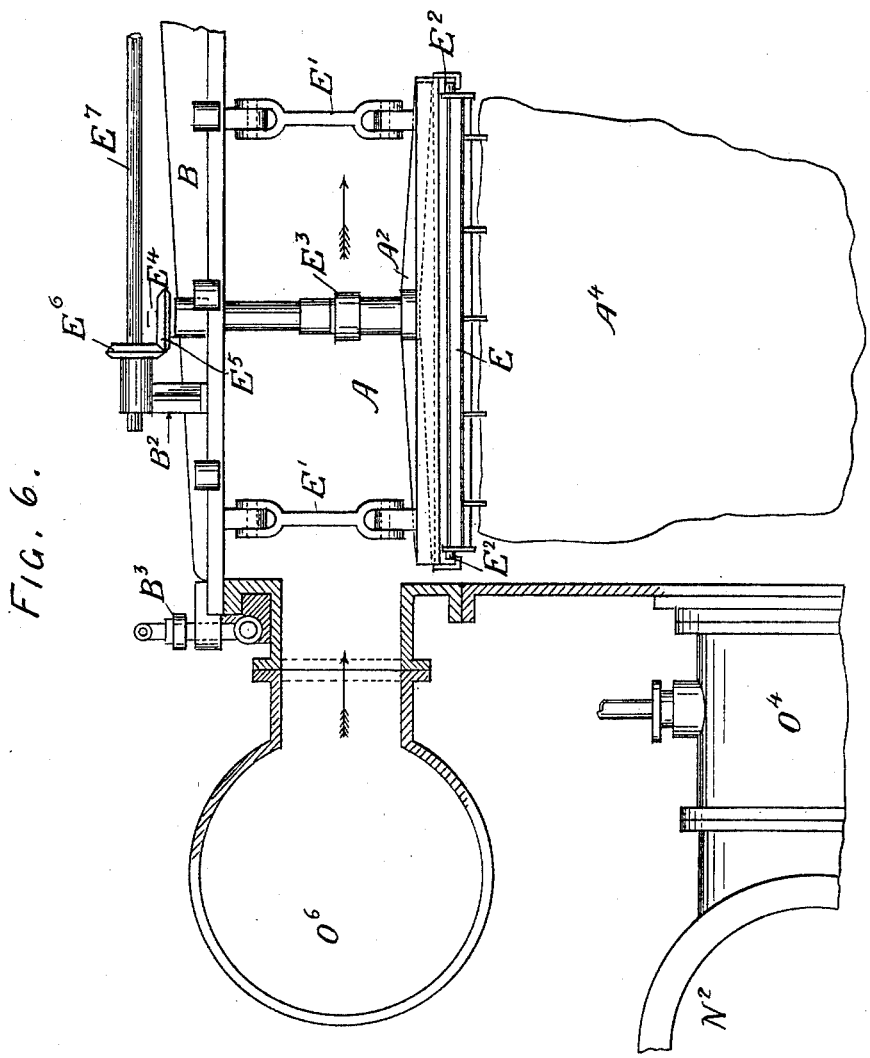

(No Model.) 10 Sheets—Sheet 8.
G. E. WRIGHT & W. MONK.
APPARATUS FOR EXTRACTING OIL.
No. 592,535. Patented Oct. 26, 1897.
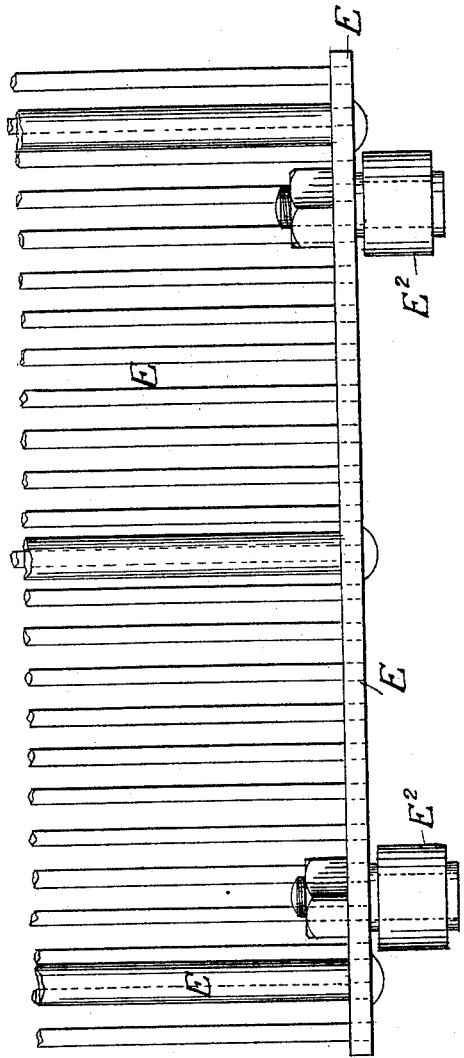
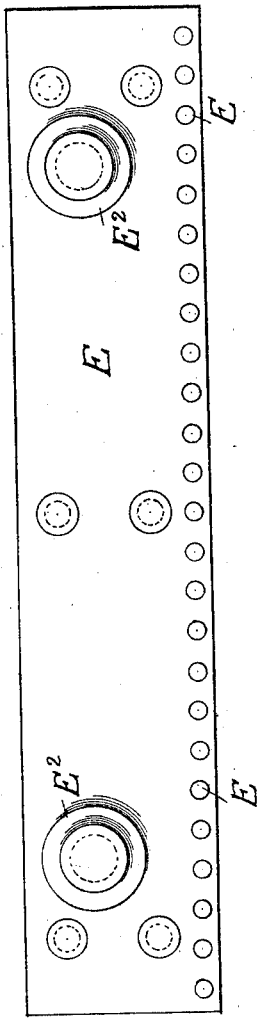
Witnesses
H. van Oldenneel
E. A. Scott
Inventors
George Edward Wright
William Monk
Richardson
Attorneys

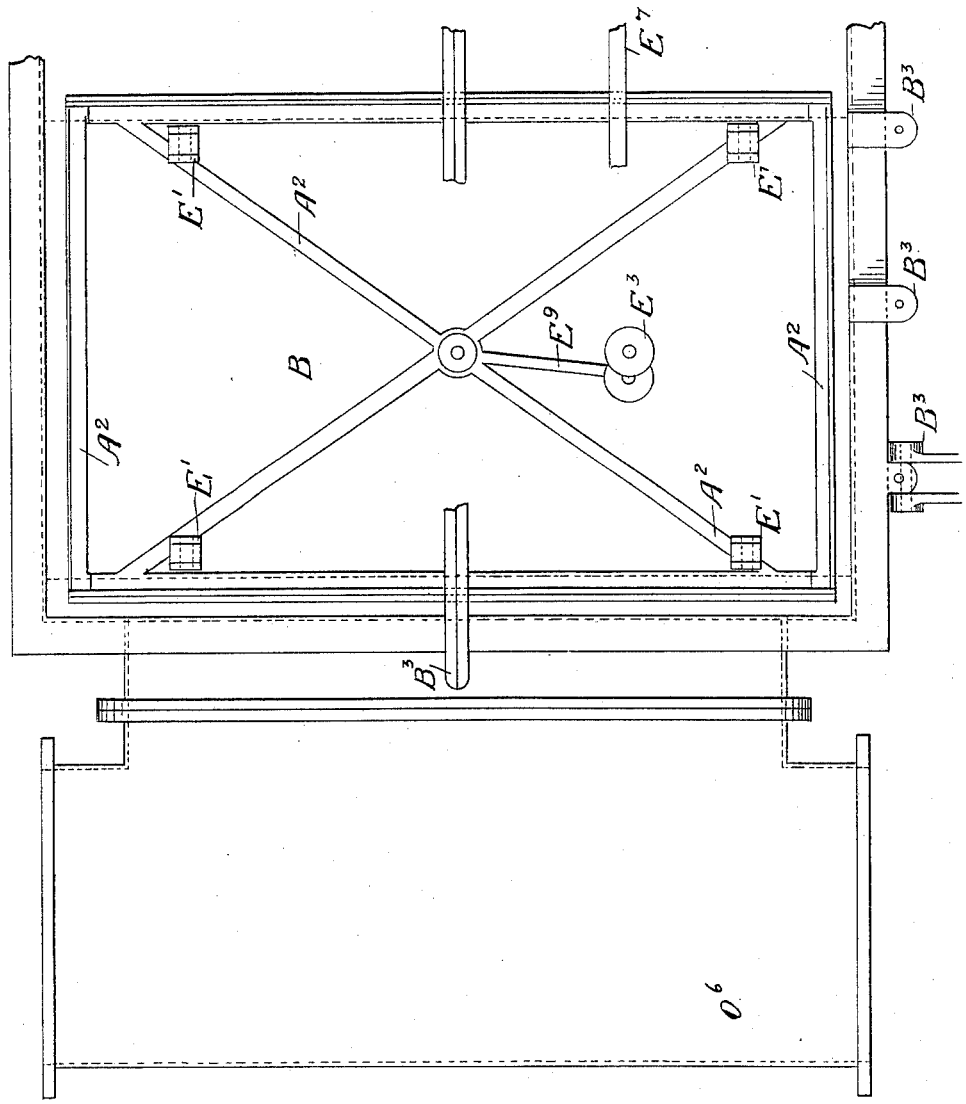

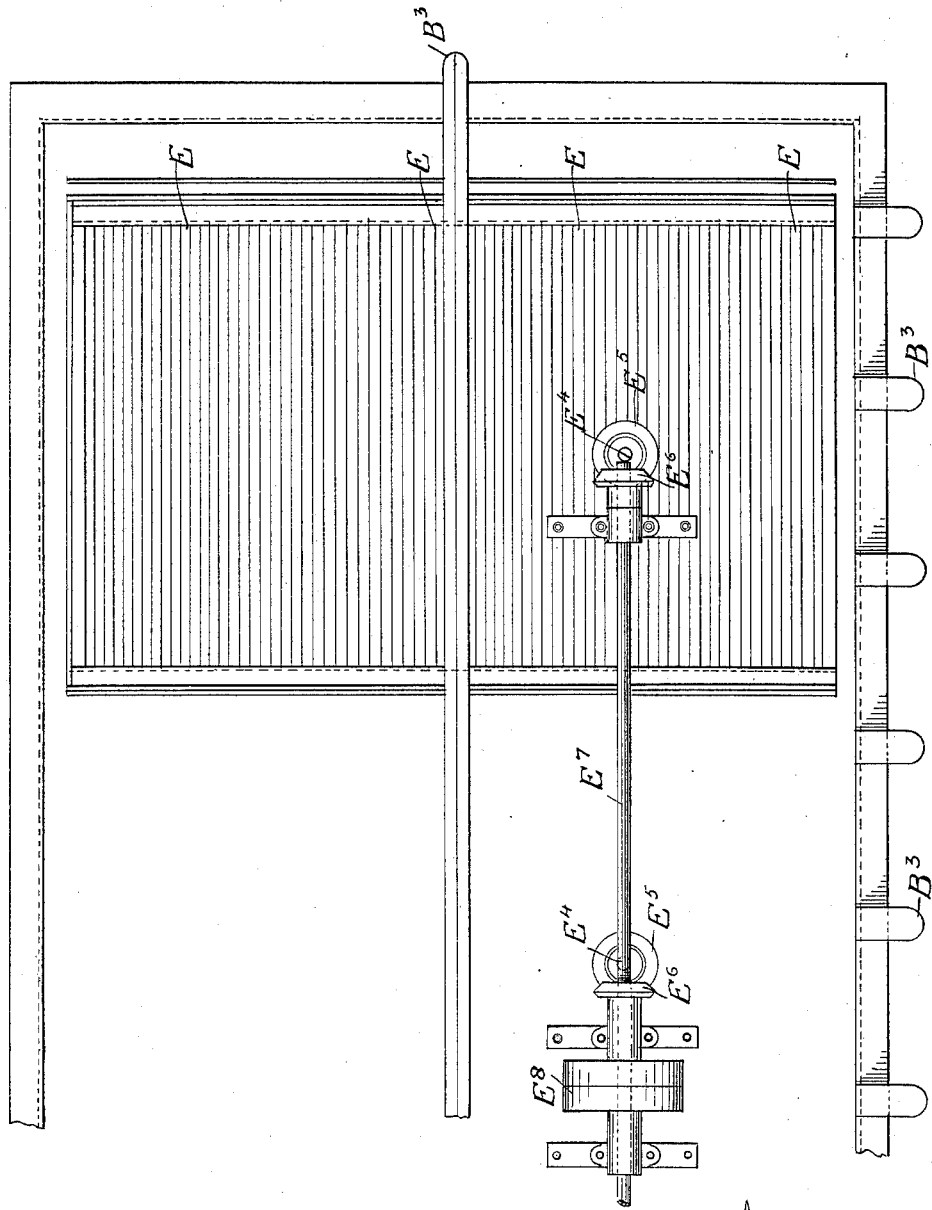

UNITED STATES PATENT OFFICE.

GEORGE EDWARD WRIGHT AND WILLIAM MONK, OF NOTTINGHAM, ENGLAND.

APPARATUS FOR EXTRACTING OIL.

SPECIFICATION forming part of Letters Patent No. 592,535, dated October 26, 1897.

Application filed July 28, 1896. Serial No. 600,805. (No model.) Patented in England May 19, 1896, No. 10,752.

*To all whom it may concern:*

Be it known that we, GEORGE EDWARD WRIGHT, of Wollaton, Nottingham, and WILLIAM MONK, of Nottingham, in the county of Nottingham, England, have invented certain new and useful Improvements in Machines for Degreasing Leather, (for which we have obtained Letters Patent in Great Britain, No. 10,752, bearing date May 19, 1896,) of which the following is a specification.

The invention resides in the features of construction and arrangement hereinafter described, and specifically pointed out in the claims.

We carry our improvements into practical effect by means of a machine or apparatus constructed substantially as hereinafter described with reference to the accompanying ten sheets of drawings, forming part of this specification.

Figure 1:
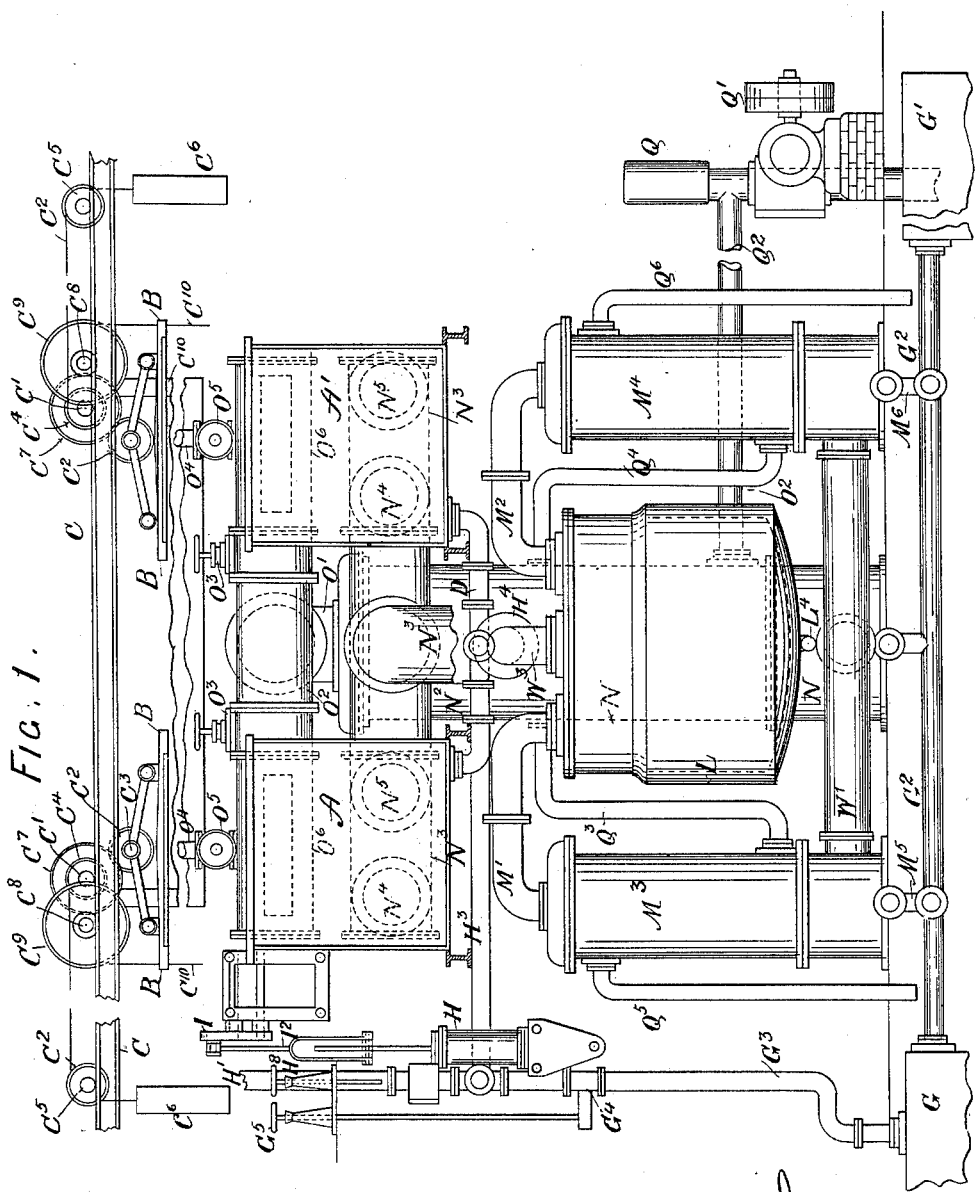
Figure 2:
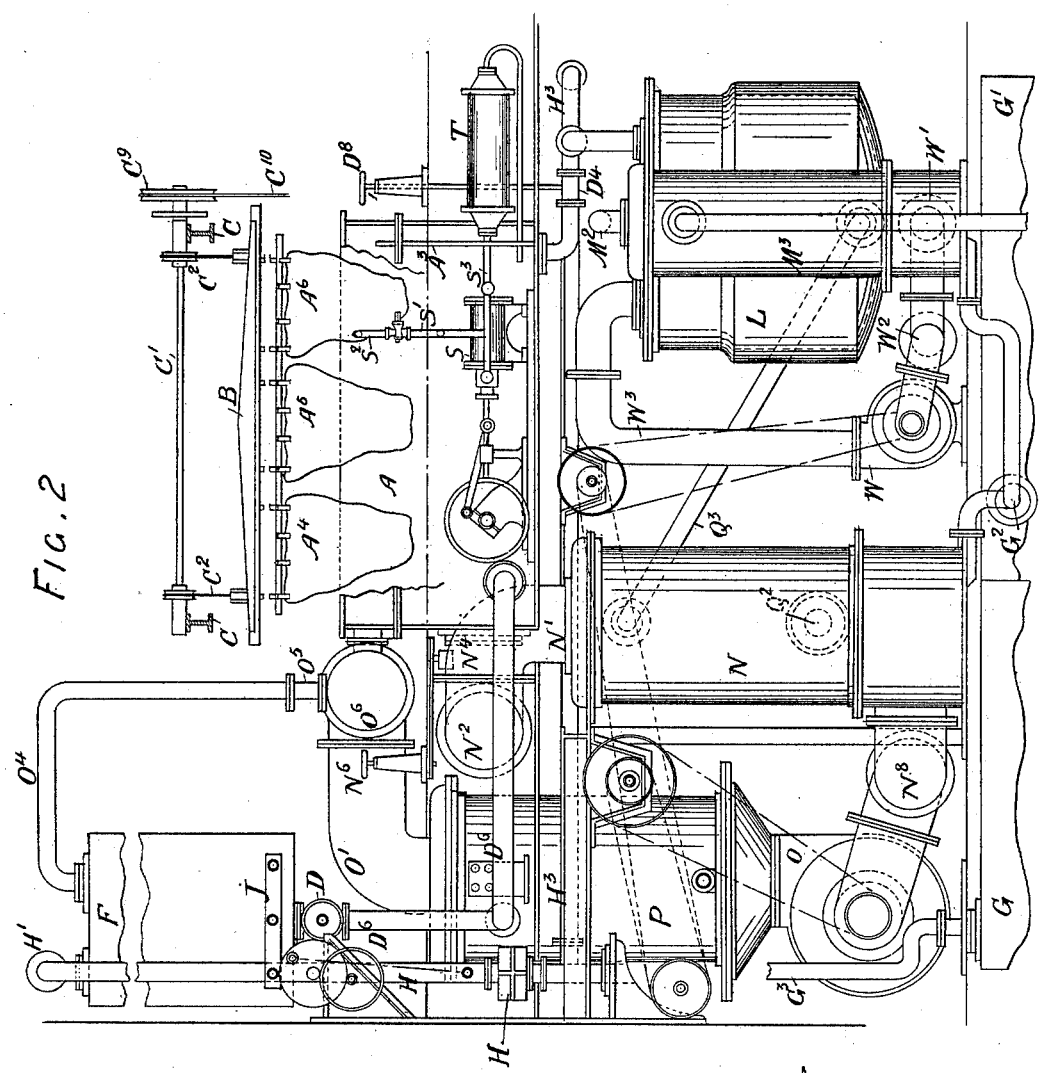
Figure 3:
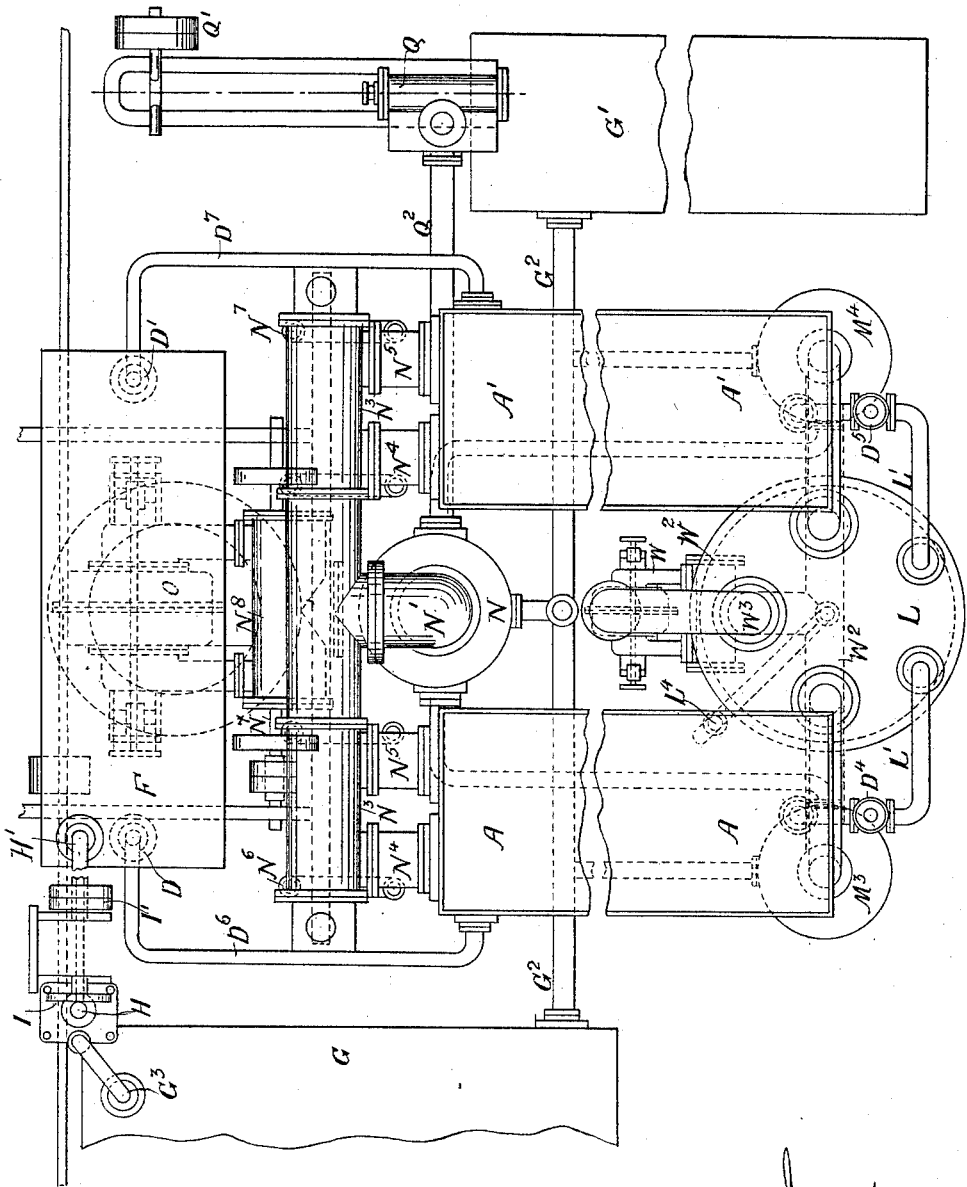

Figures 1 and 2 are elevations of the machine. Fig. 3 is a plan of the lower part, and Fig. 4 is a plan of the upper part, of the machine; and Fig. $4^a$ is a detail of part of the same. Figs. 5 to 10 are detail views of various parts of the machine.

In the construction illustrated the machine is furnished with two tanks A A' for the reception of the skins or leather goods to be degreased, so that while the degreased skins in one tank are being dried another series of skins are being degreased in the other tank.

Each of the tanks A A' is fitted with a suitable lid B, (shown in the detail views Figs. 5 and 6,) which is capable of being raised and lowered by any convenient arrangement of gearing. For example, as illustrated in Figs. 1 and 2, a shaft C' is supported in bearings carried by two girders C above the lid B and two chains $C^2$, secured at one end, respectively, to the girders. Each chain $C^2$ passes under a grooved pulley $C^3$, mounted on the lid over a chain-wheel $C^4$, fixed on the shaft C', and around a chain-wheel $C^5$ to a balance-weight $C^6$. Also, fixed on the shaft C' is a spur-wheel $C^7$, which gears with a pinion $C^8$, upon the axis of which is fixed a sprocket-wheel $C^9$, actuated by a hand-chain $C^{10}$.

The skins $A^4 A^5 A^6$, Fig. 2, to be treated are suspended by means of spring-clips or other suitable fasteners from a series of gratings E, which run on angle-iron or other suitable frames $A^2$, connected by links E' to the under side of the lid B, rollers $E^2$ being mounted on the gratings E to diminish friction and facilitate the handling of the gratings with the skins.

Any suitable arrangement of mechanism may be employed to impart a reciprocating movement to the frames $A^2$ and gratings, so as to move the skins to and fro while immersed in the solvent. We show for this purpose a crank $E^3$ on a vertical shaft $E^4$, which passes through a stuffing-box in the lid B and is supported by standards B' on the under side and standards $B^2$ on the top side of the lid. On each shaft $E^4$ is a bevel-wheel $E^5$, gearing with a bevel-wheel $E^6$ on a horizontal shaft $E^7$, supported in brackets secured to the lid. Also, mounted on the shaft $E^7$ are fast and loose pulleys $E^8$, which are driven by a belt, (not shown,) and so drive the vertical shafts $E^4$ and cranks $E^3$, which, by connecting-rods $E^9$, impart a reciprocating motion to the cross-stays of the frames $A^2$, and so to the series of gratings E, this motion assisting and accelerating the process of extracting the grease from the skins suspended from the gratings and immersed in the solvent.

The tanks A A' have suitable pipes controlled by valves D D' for regulating the ingress and $D^2$, $D^3$, $D^4$, and $D^5$ the egress of the liquid volatile solvent used in degreasing the leather placed in the tanks.

The tanks A A' are charged with the liquid volatile solvent from a charging-tank F, to which they are connected by means of pipes $D^6 D^7$, controlled by valves D D', respectively. (See Figs. 2 and 3.) The charging-tank is supplied with clean solvent from two reserve-tanks G G', which are connected together by a pipe $G^2$ and by a pipe (not shown) at a lower level, so that the solvent in each tank may be at the same height. The charging-tank F is also connected to the tanks G G' by a pipe $G^3$, controlled by a valve $G^4$, actuated by a hand-wheel $G^5$, Figs. 1 and 4, and by a pipe H' to the delivery side of a pump H. The pump H is also connected on the suction or inlet side by pipes $H^3$ $H^4$ and valves $D^2$ $D^3$, respectively, to stand-pipes $H^7$, (see Fig. 4 in plan and Fig. $4^a$ in elevation,) placed one in each tank A A', and by which means two-thirds or other desired proportion of the liquid volatile solvent from either tank can be pumped back into the charging-tank F.

The valve $D^2$, actuated by a hand-wheel $H^8$, Figs. 4 and 1, is to break connection between the pump H and the tanks A A' while the pump H is taking from G a quantity of clean solvent to make up the charge in the tank F equal to that run off by the valve $D^4$ into the evaporating-pan L for recovery, as hereinafter described.

The pump H is driven by means of a belt and pulleys I, Fig. 3, and a crank-pin on a disk I', coupled by a connecting-rod $I^2$ to the piston of the pump H, or by any other convenient arrangement of driving-gear.

Inside the tank F we place an arrangement of steam-pipes J or any other suitable means for heating a charge of liquid solvent prior to running it off by the pipe $D^6$ or $D^7$ and valve D or D' into the tank A or A', as the case may be.

The tanks A A' are connected by pipes L', controlled by valves $D^4$ $D^5$, respectively actuated by hand-wheels $D^8$ and $D^9$, Figs. 2 and 4, to the steam-jacketed pan L, which is preferably fitted with a steam-coil and into which the spent solvent when saturated with grease is run from either tank to be evaporated. The evaporating-pan L is connected by pipes M' $M^2$ to two condensers $M^3$ $M^4$, respectively, by which the volatile solvent evaporated in the pan L is condensed and recovered and returned through pipes $M^5$ $M^6$ to the pipe $G^2$ and reserve-tanks G G'. A fan W is connected on the bottom side of the condensers $M^3$ and $M^4$ by pipes W' and $W^2$ and draws air from the pan L to the condensers and discharges it by a pipe $W^3$ into the pan L again, thereby assisting vapor to pass through $M^3$ and $M^4$. The grease separated from the spent solvent in the evaporating-pan L is run off through a cock $L^4$. (Shown in Fig. 1 in elevation and Fig. 3 in plan.)

In addition to the condensers $M^3$ $M^4$, which recover the solvent evaporated in the pan L, we also employ a separate condenser N for recovering the solvent absorbed by the hot air circulated through the saturated goods during the drying process after the solvent has been run out of the tank A or A'. This condenser N is connected by pipes N' $N^2$ $N^3$ and valves $N^4$ $N^5$, actuated by chain and wheels $N^6$ and $N^7$, with the tanks A A' and on the bottom side by a pipe $N^8$ with a fan O and heater P, which is connected by pipes O' and $O^2$ and valves $O^3$ and the rectangular branch $Q^6$ to the tanks A and A' and by a pipe $O^4$ and valve $O^5$ to the charging-tank F. The fan O is driven by a belt and pulley, as shown, or in any other convenient manner, and the hot air circulated by it passes into one end of the tank A or A', as the case may be, above the suspended skins and, following the course indicated by the arrows in Fig. 6, passes downward at the other end through a perforated zinc or other suitable baffle-plate $A^3$, which distributes the hot air evenly among the goods which are suspended at an equal and known distance from each other, this arrangement preventing any skin coming in contact with another, which was a defect in previous methods of hanging goods on skewers. The hot air passes out by valves $N^4$ and $N^5$ and by pipes $N^2$, $N^3$, and N' into the condenser N, where the solvent absorbed by the hot air in its passage through the saturated goods is recovered and drained off into the reserve-tank G or G', the air being drawn again through the heater P by the fan O and passing thence into the tanks A A' through the goods, as before described.

To keep the condensers $M^3$, $M^4$, and N cool, a pump Q, (shown in Fig. 1,) driven by a belt and pair of pulleys Q' or otherwise, as convenient, is employed to circulate cold water through the condensers, the water being supplied to the condenser N by a pipe $Q^2$ and passing thence by pipes $Q^3$ $Q^4$ into the condensers $M^3$ $M^4$, from which it is discharged through pipes $Q^5$ $Q^6$, respectively.

To agitate and maintain the temperature of the liquid volatile solvent in which the skins are immersed during the degreasing process, we employ perforated pipes R inside each tank A A', through which pipes air under pressure is forced by an air-pump S through a heater T. The air is drawn from the top of the tank A or A' above the level of the liquid solvent therein through a pipe S', controlled by valves $S^2$, into the air-pump S, whence it is forced through a pipe $S^3$ into the heater T, and then raised to the desired temperature. Passing through a valve $S^4$, Fig. 4, it is forced through the perforated pipes R into the tank A or A', thus completing the circuit.

Having specified the several parts of the machine, we will now proceed to describe how we carry out the operation of degreasing leather therein.

We first release the fastenings $B^3$, Figs. 6 and 8, by which the lid B is made air-tight and retained in position on its tank A or A'. For convenience of description we will suppose that the operation is in this case to be carried out in the tank A. We then by means of the hand-chain $C^{10}$ and gearing described raise the lid B clear of the tank A and draw the gratings E on their rollers $E^2$ out of the frames $A^2$ and take off the goods, which we will suppose have already been degreased. These gratings are then put aside to be refilled with skins during the time that the goods are drying in the other tank A', and we take a third set of gratings E, which have been filled with skins while the goods were drying in the tank A, and slide them into their places on the frames $A^2$. This having been done, the lid is lowered and secured by the fasteners $B^3$, and the following valves are closed: the valve D⁴, to shut off communication with the evaporating-pan L; the valve O³, to shut off the hot air from the fan O and heater P, and the valves N⁴ N⁵, shutting off the condenser N from the tank A. Then the valve D is opened to allow the charge of warm liquid volatile solvent in the charging-tank F to flow into the tank A, and the valve O⁵ is opened to allow the air displaced by the solvent to pass from the tank A through the pipe O⁴ into the tank F. When the charge of solvent has entered the tank A, the valve D is closed, the valves S² and S⁴ are opened, the air-pump S is set in motion, thereby circulating warm air through the perforated pipes R, as before described, and the belt is put on the fast pulley E⁸, so as to drive the shaft E⁷ and agitate the frames A² with the gratings E and the skins immersed in the solvent. This process is continued, say, for an hour or more, or less, as required, until the skins are completely degreased. Then the belt is shifted from the fast to the loose pulley E⁸ to stop the rotation of the shaft E⁷ and the oscillation of the frames A² and gratings E, and the pump S is also stopped to interrupt the air circulation through the perforated pipes R.

On completion of the degreasing process and after an interval of at least ten minutes to allow time for the grease and solid matters to settle somewhat in the tank A the valve D², actuated by the hand-wheel H⁸, is opened and the pump H started and two-thirds of the liquid solvent in the tank A pumped back to the charging-tank F until the solvent is reduced to the level of the top of the stand-pipe H⁷. Then the valve D² is closed and the valve D⁴ is opened, and the one-third charge of solvent remaining in the tank A is run off into the evaporating-pan L. The valve D⁴ is then closed, and the solvent is then evaporated in the pan L, the grease and solids separated and collected, the vapor condensed in the condensers M³ M⁴, and the recovered liquid solvent thus purified is run off through the pipe G² into the reserve-tank G or G'. While the separation of the grease and the purification and recovery of the liquid volatile solvent is taking place the valves N⁴ and N⁵ are opened and the fan O set in motion, and air heated by the heater P is circulated through the tank A, flowing evenly and softly between and about the suspended skins and gradually absorbing the liquid volatile solvent with which they are saturated. As the saturated air passes through the condenser N the vapor is condensed into liquid and the volatile solvent recovered in that form, the purified air passing forward to the tank A after being reheated in the heater P. This air circulation and drying process is continued for, say, an hour or an hour and a half, until the skins are quite dry and all the solvent has been recovered. The valves N⁴ N⁵ are then closed, the lid B is released, and the gratings E, with the degreased skins, are then removed from the tank A and a fresh set substituted in the manner described.

We wish it to be clearly understood that we do not limit ourselves to the several details nor to the particular construction or arrangement of the parts herein shown and described, as the same may be considerably varied and modified without departing from the essential features of our invention hereinbefore specified and as hereinafter pointed out in the claims. For example, we might employ a single tank and appurtenances, but we prefer to duplicate the tanks and connections, so that while the degreased skins in the tank A are being dried another series of skins may be degreased in the tank A', and vice versa. Again, we might employ one supply-tank instead of the two tanks G G', and instead of the pumps, fans, and condensers employed we might employ any suitable equivalents.

Having now particularly described and ascertained the nature of our said invention and in what manner the same is to be performed, we declare that what we claim, and desire to secure by Letters Patent of the United States, is—

1. In combination with a degreasing-tank, an evaporator, an air-circulating system connected therewith including a condenser, a second air-circulating system connected to the tank independently of the evaporator, said second system including a condenser, and a valve for cutting off the evaporator with its air-circulating system from the tank, substantially as described.

2. In combination, the degreasing-tank having a stand-pipe H therein, the removable cover adapted to carry the skins, a charging-tank connected with the stand-pipe, an evaporator connected with the degreasing-tank and a condenser with independent air-circulating systems for the evaporator and the degreasing-tank, substantially as described.

3. The combination with a tank such as A or A', of a movable lid fitted with sliding frames carrying the gratings or equivalents from which the skins are suspended at equal distances apart and means for moving said frames during the degreasing process said covers with the sliding frames being movable vertically to and from the tanks substantially as herein set forth.

4. In a degreasing apparatus, the combination of a degreasing-tank with inlet and outlet pipes for the liquid solvents, both of said pipes entering the tank at or near the bottom and the removable cover carrying the skins, substantially as described.

5. The combination with a tank such as A or A', of means for withdrawing air from above the level of the liquid volatile solvent in the tank and then heating and forcing the air again into the tank through perforated pipes or equivalents in order to agitate and aerate the solvent and facilitate the degreasing process substantially as herein set forth.

6. In combination, the tank, a cover, a baffle-plate A³ at one end thereof and an air-circulating system having both its inlet and outlet pipe connected to the tank at the end opposite the baffle-plate whereby the entering air will pass along the top of the tank and return between the skins suspended therein to the outlet at the same end as the inlet, substantially as described.

7. In combination, a degreasing-tank having a baffle-plate and an air-circulating system having both its inlet and outlet ends at the same end of the tank and directed across the same to the opposite end, substantially as described.

In witness whereof we have hereunto set our hands in presence of two witnesses.

GEORGE EDWARD WRIGHT.
WILLIAM MONK.

Witnesses:
THOS. H. COOK,
DOUGLAS E. STORER.